United States Patent
Hong et al.

(10) Patent No.: US 6,542,156 B1
(45) Date of Patent: Apr. 1, 2003

(54) TELEPHONE CALL CENTER MONITORING SYSTEM WITH INTEGRATED THREE-DIMENSIONAL DISPLAY OF MULTIPLE SPLIT ACTIVITY DATA

(75) Inventors: Lichan Hong, Naperville, IL (US); Kenneth Charles Cox, Naperville, IL (US); Vladimir Nepustil, Boulder, CO (US); Paul Lawrence Richman, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/358,595

(22) Filed: Jul. 21, 1999

(51) Int. Cl.[7] .............................................. G06T 11/20
(52) U.S. Cl. ................ 345/440; 379/265.09; 379/93.17
(58) Field of Search ......................... 379/111, 265.01, 379/265, 265.09, 93.17; 345/440, 850, 163

(56) References Cited

U.S. PATENT DOCUMENTS

| | | | | | |
|---|---|---|---|---|---|
| 4,510,351 A | * | 4/1985 | Costello et al. | ........ | 379/265.01 |
| 4,988,209 A | * | 1/1991 | Davidson et al. | ........... | 379/111 |
| 5,581,678 A | * | 12/1996 | Kahn | ......................... | 345/440 |
| 5,861,885 A | * | 1/1999 | Strasnick et al. | ........... | 345/850 |
| 5,946,386 A | * | 8/1999 | Rogers et al. | .............. | 379/265 |
| 6,215,473 B1 | * | 4/2001 | Suzuki | ....................... | 345/163 |
| 6,222,540 B1 | * | 4/2001 | Sacerdoti | ..................... | 345/440 |

* cited by examiner

Primary Examiner—Jeffery Brier
Assistant Examiner—Faranak Fouladi
(74) Attorney, Agent, or Firm—David Volejnicek

(57) ABSTRACT

A novel telephone call center split monitoring and display system, uses an integrated three-dimensional bar chart to display multiple split activity information in a single view, enabling easy comparison and multiple split monitoring by split managers without crowded views or frequent toggling between several views.

28 Claims, 3 Drawing Sheets

TELEPHONE CALL CENTER MONITORING SYSTEM WITH INTEGRATED THREE-DIMENSIONAL DISPLAY OF MULTIPLE SPLIT ACTIVITY DATA

BACKGROUND OF THE INVENTION

1. Field of the Invention

The present invention relates to improvements m monitoring and managing agents and telephone call activity in telephone call centers.

2. Background of Related Art

Telephone call centers (or call centers) are networked groups of telephone operators or "agents" that provide customer service for telephone callers. Call centers can be in many different forms, from large Operator Service Systems (OSSs) under the control of telephone companies to smaller is private ones such as corporate customer service centers and telemarketing groups.

An important function of a call center is to provide efficient service to all customers, including timely and satisfactory handling of all received calls. Prior art automatic call distribution (ACD) systems are software-hardware hybrids for helping to efficiently switch incoming telephone calls to suitable and available operators. Notwithstanding the use of an ACD system, a call center has one or more human managers monitoring all or a designated portion of the calls received and handled by it.

Call center agents are often grouped according to "splits." A split can be a type of service provided during a telephone call or a type of skill possessed by an agent. For example, one split might handle credit card orders, another might handle customer complaints, and yet another split might handle technical support. A split manager monitors the calls received by a split and either assigns calls or overrides the ACD system when thought necessary. In addition to assigning calls or overriding the ACD, the manager often adjusts the parameters of the ACD to influence the ACD behavior. For example, the manager could assign some back-up agents to work in a busy ACD.

A manager may be responsible for more than one split, and even all splits in some call centers. It is also possible that a multi-skilled agent can work in more than one split. In some instances, a split manager might like to have information about other splits of the call center while assigning calls to his or her agents.

Prior art call centers often employ bar graph displays such as the one shown in FIG. 1 to allow managers to monitor the present and cumulative activities of a split. For example, the number of calls waiting to be processed by a split might be tracked, as well as many other data to be tracked, such as how many calls were abandoned (hang-ups perhaps due to customer waiting fatigue), or the duration of the oldest call on hold.

In prior art systems, a manager wishing to monitor many splits simultaneously must inevitably overlap at least some of the split displays because of practical limitations on monitor sizes. Thus, in order to view all of the splits, the manager must "toggle" between different displays by a series of keystrokes. However, this toggling requirement makes it difficult to make good comparisons, since the manager must remember and mentally integrate information from multiple displays.

Accordingly, what is lacking in the prior art is an efficient call center monitoring system for convenient viewing of multiple split activity details.

SUMMARY OF THE INVENTION

In view of the above-identified problems and limitations of the prior art, the present invention provides a method of displaying telephone call center split activity and status information at least including the steps of:

predefining a plurality of splits for activity monitoring;

via split activity monitors, monitoring predefined splits for call processing activity and outputting data reflective of the telephone call processing activity;

combining data received from the split activity monitors and outputting a combined split activity signal;

via a three-dimensional (3-D) graph generator coupled to the split activity data combiner, outputting a series of 3-D graphs, each graph representing a combination of multiple split activity data; and displaying 3-D graphs output from the 3-D graph generator.

The present invention also provides, a telephone call center split activity and status information monitoring and display system at least including:

a plurality of split activity monitors, reach adapted to monitor a split for telephone call processing activity, and for outputting data reflective of the telephone call processing activity;

a split activity data combiner coupled to the split activity monitors, the split activity data combiner adapted to combine data received from the split activity monitors and output a combined split activity signal;

a 3-D graph generator coupled to the split activity data combiner, the 3-D graph generator adapted to output a series of 3-D graphs, each graph representing a combination of multiple split activity data;

a user input/output (I/O) device coupled to the 3-D graph generator;

a display coupled to the user I/O device adapted to display 3-D graphs output from the 3-D graph generator; and a controller coupled to the split activity monitors, the split activity data combiner, the 3-D graph generator, and the user I/O device, the controller adapted to control the operation of the system.

BRIEF DESCRIPTION OF THE DRAWING FIGURES

Features and advantages of the present invention will become apparent to those skilled in the art from the description below, with reference to the following drawing figures, in which.

DESCRIPTION OF THE PREFERRED EMBODIMENTS

Figure 1:
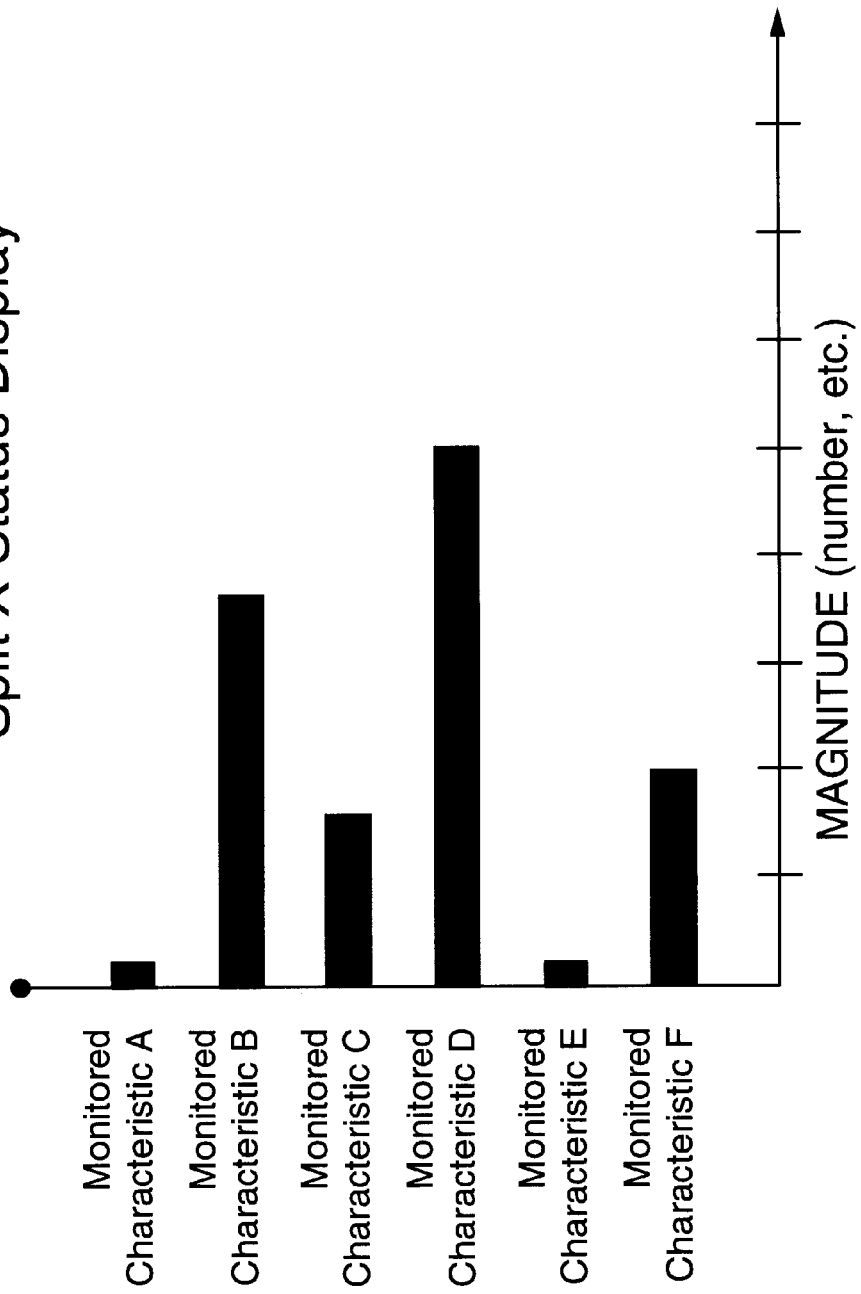
FIG. 1 is an example of a prior art split status bar chart.
Figure 2:
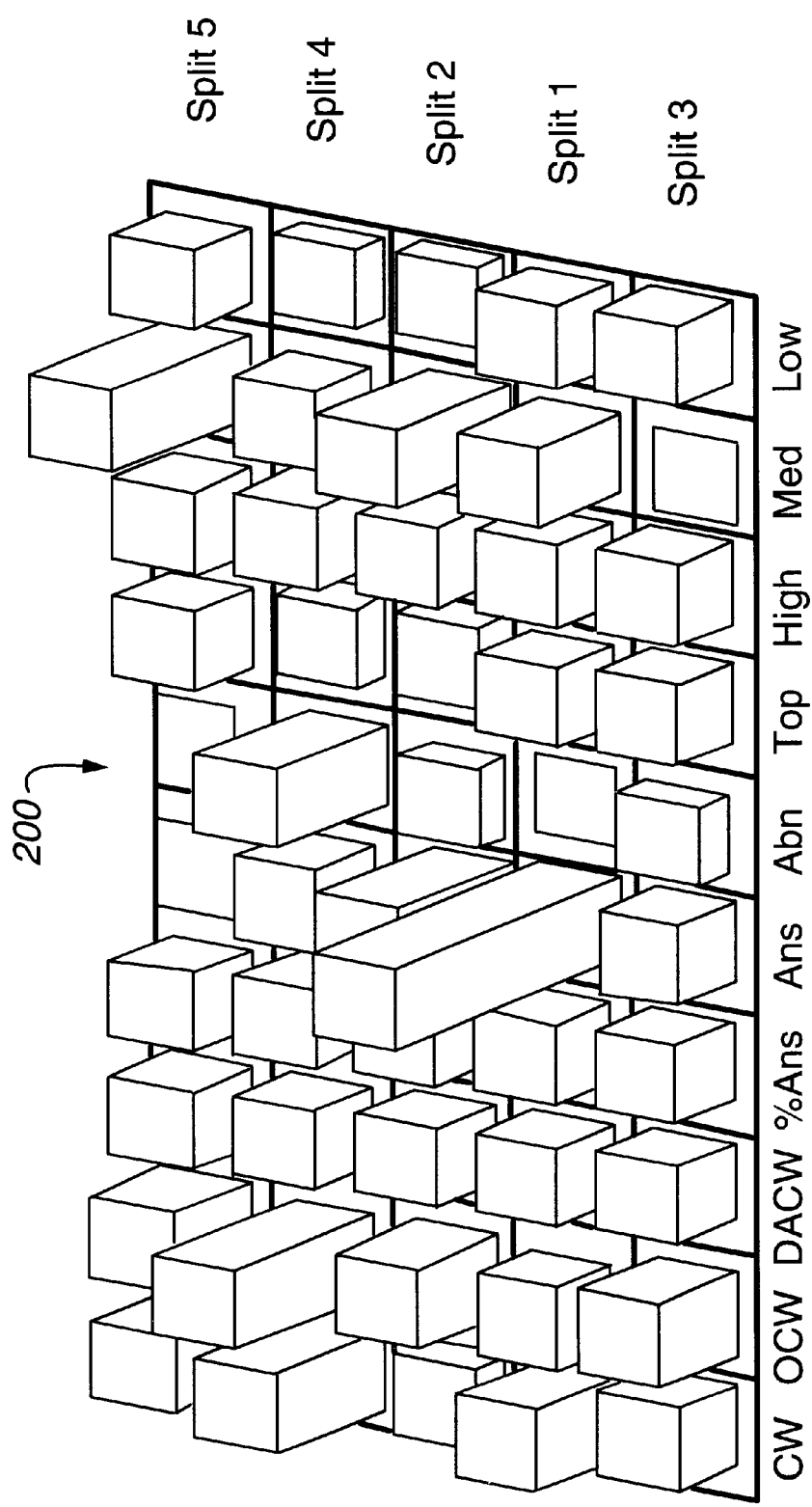
FIG. 2 is an example of a present-inventive, three-dimensional multiple split status bar chart.

FIG. 2 illustrates a single view, three-dimensional (3-D) bar chart 200 displayed by the present-inventive system and method. In the particular illustration, a manager responsible for Split 3, can simultaneously monitor both the split activity status data of Split 3 and also the activity status data of other splits of interest. The graph 200 is updated in real time, and represents the cumulative activity statuses of the monitored splits from a pre-selected time to present. A variety of activity statuses can be monitored and three-dimensionally displayed in the same graph for the chosen splits.

Although not exhaustive, the following are examples of split activity statuses monitored and displayed by the present-inventive system and method: number of calls waiting (CW); duration of the oldest call waiting (OCW); number of direct agent calls waiting (DACW); percentage of calls answered within a pre-selected time (%Ans); number of calls answered (Ans); number of calls abandoned (Abn); the expected wait time for top priority calls (Top); the expected wait time for high priority calls (High); the expected wait time for medium priority calls (Med); and the expected wait time for low priority calls (Low).

The dynamic 3-D bar chart 200 of the present invention aids in a variety of split management functions. By being able to conveniently compare the various statuses of several splits, for example, a manager is able to detect aberrations within the split for which he or she is responsible, and make split adjustments accordingly.

The 3-D bar graph of the present invention has other characteristics of note. As would be expected, the height of the bars represents the magnitude of the displayed split data. In the preferred embodiment, the magnitude of the split data can also be alphanumerically displayed contiguous to the bar by moving the cursor (via a mouse or other cursor control device) to a position above the bar of interest. In an alternate embodiment, an activation button on the cursor control device must also be pressed to activate the alphanumeric value of the selected bar. The colors of the bars are a matter of design choice, and can be uniform, or many contrasting ones for better distinguishing when many bars are displayed in close proximity. Alternatively, different colors might translate to split activity status magnitudes for encoding purposes.

Also, the user can freely alter the virtual vantage point of the 3-D bar chart 200 to obtain an optimum view for readily distinguishing between the various bars. This gives the appearance of rotating the 3-D bar chart along three possible virtual axes. The 3-D bar chart 200 can also be scaled according to the split manager's desire.

The 3-D bar chart 200 is used in the present specification for illustrative purposes, and it will be apparent to those skilled in the art that all of the split activity statuses labeled in FIG. 2 can have a bar displayed therefor in a full implementation of the present invention.

Figure 3:
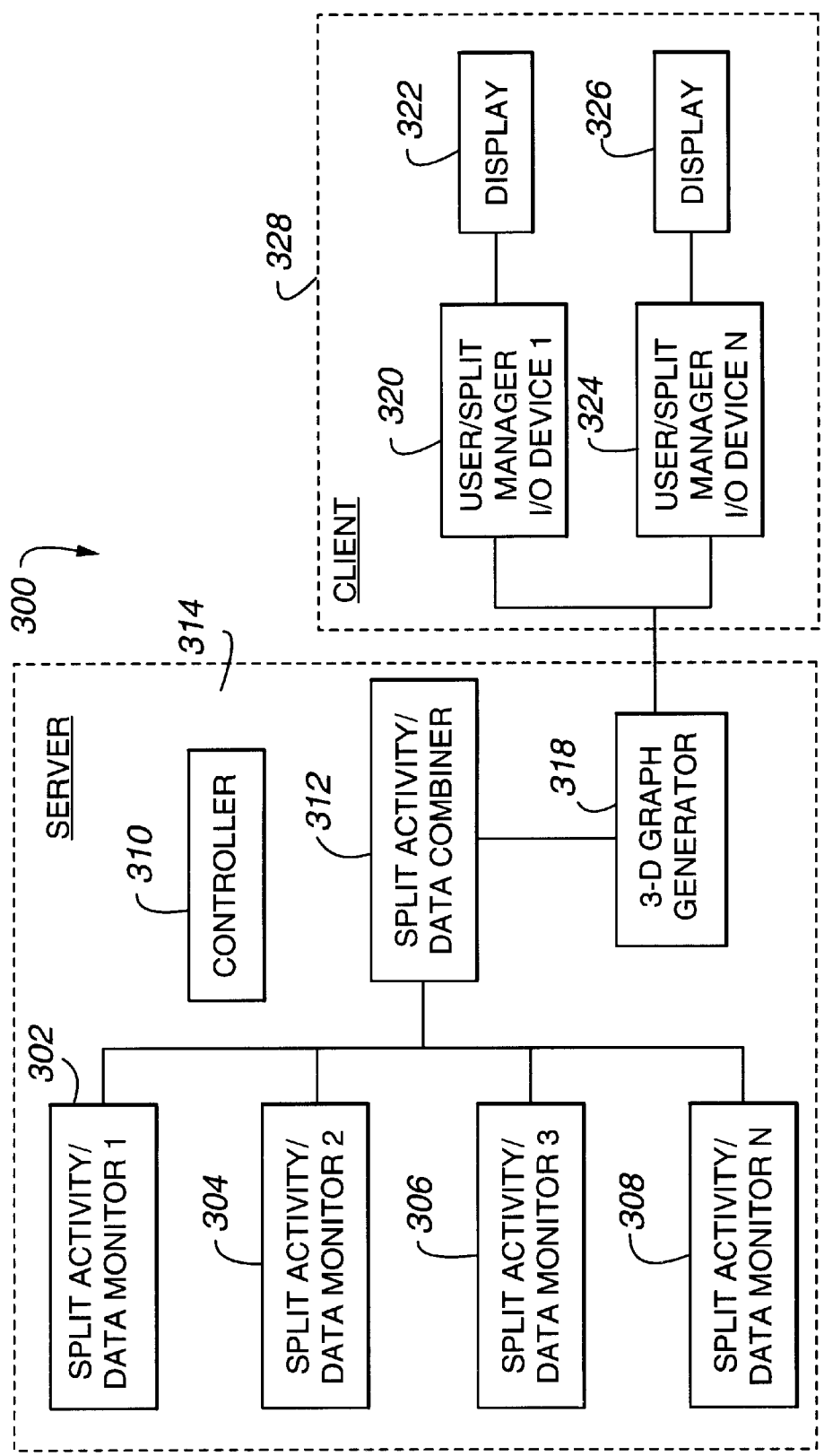
FIG. 3 is a schematic block diagram of a system used to generate and display a present-inventive, three-dimensional multiple split status bar chart.

A basic schematic diagram of the present-inventive system 300 is shown in FIG. 3. The system 300 is a networked client-server system.

One or more servers 314 with a controller 310, act as system controllers, to cause the collection of split data via several split activity/data monitors (302–308 in the figure) that dynamically monitor and output data reflective of the split activity status of each assigned call center split. The system 300 is scaleable, and reconfigures itself to establish any number of split monitors, according to design and operation choice. The server also causes the split data from each split monitor to be combined by a split activity/data combiner 312. The combiner 312 combines the split data from several split activity/data monitors and passes it to a 3-D graph generator 318.

The 3-D graph generator 318 converts the data received from the combiner 312 to a 3-D view of the chosen splits. The 3-D bar chart is output to one of the clients (328) of the system, including user/split manager I/O devices (320, 324, etc.) for display on screens and the like (322, 326, etc.).

During the operation of the call center, a split manager can request to display a 3-D bar chart of several enumerated splits via an I/O device. The split manager also specifies the virtual vantage point and any relevant scaling information with this request. The split activity/data monitors of the enumerated splits output split data to the split activity/data combiner 312. The combiner sends the combined split data to the 3-D graph generator 318. The 3-D graph generator generates a 3-D bar graph view in response, which 3-D view can be received by a split manager I/O device and displayed.

The system can simultaneously support several real-time 3-D bar chart displays, made available to several requesting split managers.

Variations and modifications of the present invention are possible, given the above description. However, all variations and modifications which are obvious to those skilled in the art to which the present invention pertains are considered to be within the scope of the protection granted by this Letters Patent.

For example, the present invention is not limited to telephone call centers, but is applicable to any type of customer contact center using any type of telecommunication means including but not limited to telephones, on-line communication devices such as computers, radio frequency transceivers, and interactive television. The contact method is not limited to telephone calls, but may be in the form of other electronic means, including e-mail and other digital messaging. Further, "agent" is hereby broadly defined to include any sort of organic or inorganic entity or instrumentality capable of processing customer communication needs.

What is claimed is:

1. A method of displaying customer contact center split activity and status information comprising the steps of:

predefining a plurality of splits for activity monitoring;

via split activity monitors, simultaneously dynamically monitoring predefined splits for customer contact processing activity and outputting a plurality of items of data updated substantially in real time and reflective of said customer contact processing activity;

via a split activity data combiner, combining the data received from said split activity monitors and outputting a combined split.activity signal;

via a three-dimensional (3-D) graph generator coupled to said split activity data combiner, outputting a series of 3-D graphs, each said 3-D graph being updated substantially in real time and graphically representing simultaneously and separately each one of a multiplicity of the items of the data simultaneously and separately for each one of a multiplicity of the splits in a single said 3-D graph having a virtual vantage point alterable by a user to obtain a desired view for distinguishing between the items of the data of the multiplicity of the splits; and displaying the 3-D graphs output from said 3-D graph generator.

2. The method in claim 1 wherein said 3-D graphs are displayed in real-time.

3. The method in claim 1 wherein 3-D graphs are in the form of bar charts.

4. The method in claim 3 wherein each bar in said bar charts represents a predefined split activity status.

5. The method in claim 4 wherein the height of each bar corresponds to the magnitude of the represented split activity status.

6. The method in claim 5 wherein alphanumeric values each corresponding to the magnitude of a corresponding one of said bars are each selectively displayed contiguous to said corresponding bar.

7. The method in claim 4 wherein said bars have different colors to distinguish therebetween.

8. The method in claim 4 wherein colors or said bars are used to encode split data.

9. The method in claim 1 wherein said split activity status comprises the number of calls waiting to be handled by a split.

10. The method in claim 1 wherein said split activity status comprises the duration of the oldest waiting call.

11. The method in claim 1 wherein said split activity status comprises the number of calls answered.

12. The method in claim 1 wherein said split activity status comprises the number of calls abandoned.

13. The method in claim 1 wherein said 3-D graphs have an adjustable virtual vantage point rotatable around at least two axes.

14. The method in claim 1 wherein said 3-D graphs have an adjustable virtual vantage point rotatable around three axes.

15. A customer contact center split activity and status information monitoring and display system comprising:
   a plurality of split activity monitors for simultaneously dynamically monitoring predefined splits for customer contact processing activity, each adapted to dynamically monitor a split for customer contact processing activity, and for outputting a plurality of items of data updated substantially in real time and reflective of said customer contact processing activity;
   a split activity data combiner coupled to said split activity monitors, said split activity data combiner adapted to combine the data received from said split activity monitors and output a combined split activity signal;
   a three-dimensional (3-D) graph generator coupled to said split activity data combiner, said 3-D graph generator adapted to output a series of 3-D graphs, each said 3-D graph being updated substantially in real time and graphically representing simultaneously and separately each one of a multiplicity of the items of the data simultaneously and separately for each one of a multiplicity of the splits in a single said 3-D graph having a virtual vantage point;
   a user input/output (I/O) device coupled to said 3-D graph generator;
   a display coupled to said user I/O device adapted to display the 3-D graphs output from said 3-D graph generator; and
   a controller coupled to said split activity monitors, said split activity data combiner, said 3-D graph generator, and said user I/O device, said controller adapted to control the operation of said system including to alter the virtual vantage point under user control to obtain a desired view for distinguishing between the items of the data of the multiplicity of the splits.

16. The system in claim 15 wherein said 3-D graphs are displayed in real-time.

17. The system in claim 15 wherein 3-D graphs are in the form of bar charts.

18. The system in claim 17 wherein each bar in said bar charts represents a predefined split activity status.

19. The system in claim 18 wherein the height of each bar corresponds to the magnitude of the represented split activity status.

20. The method in claim 19 wherein alphanumeric values each corresponding to the magnitude of a corresponding one of said bars are each selectively displayed contiguous to said corresponding bar.

21. The system in claim 18 wherein said bars have different colors is to distinguish therebetween.

22. The system in claim 18 wherein colors or said bars are used to encode split data.

23. The system in claim 15 wherein said split activity status comprises the number of calls waiting to be handled by a split.

24. The system in claim 15 wherein said split activity status comprises the duration of the oldest waiting call.

25. The system in claim 15 wherein said split activity status comprises the number of calls answered.

26. The system in claim 15 wherein said split activity status comprises the number of calls abandoned.

27. The system in claim 15 wherein said 3-D graphs have an adjustable virtual vantage point rotatable around at least two axes.

28. The system in claim 15 wherein said 3-D graphs have an adjustable virtual vantage point rotatable around three axes.

* * * * *